United States Patent [19]

Parkander

[11] Patent Number: 5,783,265
[45] Date of Patent: Jul. 21, 1998

[54] SIGN, PREFERABLY REGISTRATION SIGN FOR VEHICLES, AND METHOD FOR THE MANUFACTURE THEREOF

[75] Inventor: Göthe Anders Krister Parkander, Ljungby, Sweden

[73] Assignee: Stralfors AB, Ljungby, Sweden

[21] Appl. No.: 800,473

[22] Filed: Feb. 14, 1997

Related U.S. Application Data

[63] Continuation of Ser. No. 201,010, Feb. 24, 1994, abandoned.

[30] Foreign Application Priority Data

Mar. 5, 1993 [SE] Sweden ............................ 9300734

[51] Int. Cl.$^6$ .................................................. B60R 13/10
[52] U.S. Cl. .......................... 428/13; 40/208; 40/209; 428/14; 428/31
[58] Field of Search ........................... 428/13, 14, 31, 428/913, 195; 40/209, 208

[56] References Cited

U.S. PATENT DOCUMENTS

| | | | |
|---|---|---|---|
| 4,267,556 | 5/1981 | Fotland et al. | 347/127 |
| 4,626,185 | 12/1986 | Monnet | 425/110 |
| 4,840,863 | 6/1989 | Otsu et al. | 430/110 |
| 4,935,324 | 6/1990 | Grushkin et al. | 430/98 |
| 5,017,416 | 5/1991 | Imperial et al. | 428/195 |
| 5,085,918 | 2/1992 | Rajan et al. | 428/913 X |
| 5,153,091 | 10/1992 | Veregin et al. | 430/126 |
| 5,213,872 | 5/1993 | Pricone et al. | 428/913 X |
| 5,310,436 | 5/1994 | Pricone et al. | 428/30 X |

FOREIGN PATENT DOCUMENTS

| | | |
|---|---|---|
| 0268402 | 5/1988 | European Pat. Off. . |
| 0 440 814 A1 | 8/1991 | European Pat. Off. . |
| 0457544 | 11/1991 | European Pat. Off. . |
| 2126389 | 3/1984 | United Kingdom . |
| 9218328 | 10/1992 | WIPO . |

*Primary Examiner*—Henry F. Epstein
*Attorney, Agent, or Firm*—McCormick, Paulding & Huber

[57] ABSTRACT

The present invention relates to a sign, preferably a registration sign for vehicles, which sign (2) includes a portion or member (16) consisting of a portion of a film web (6) or of a row of separate film portions, whereby said portion (16) is provided with information (3), preferably registration symbols or characters for vehicles, while toner material (25) has been applied thereon by electronically variable application in an electronic printer. For being able to manufacture this sign at low costs and by means of a simple manufacturing method, the toner material is applied on a surface of said portion (16), preferably a surface (23) reflecting light from headlamps, by means of an electronic printer in the form of an ionographic printer (24) wherein the toner material is fixed on the surface of said portion (16) with pressure by a cold pressure and fixing method. (FIG. 1).

9 Claims, 5 Drawing Sheets

SIGN, PREFERABLY REGISTRATION SIGN FOR VEHICLES, AND METHOD FOR THE MANUFACTURE THEREOF

This is a continuation of application Ser. No. 08/201,010 filed on Feb. 24, 1994, now abandoned.

FIELD OF THE INVENTION

The present invention relates to a sign, preferably a registration sign for vehicles, which sign includes a member consisting of a portion of a film web or of a row of separate film portions, whereby said member or portion is provided with information, preferably registration symbols or characters for vehicles, while toner material has been applied thereon by electronically variable application in an electronic printer.

The present invention also relates to a method for the manufacture of a sign such as aforesaid.

BACKGROUND OF THE INVENTION

From EP, A1, 457 544 it is already known to provide registration information on registration signs for vehicles by means of electronic printers and according to a predetermined program. Hereby, the electronic printers transfer a toner material to a travelling web of material in accordance with said program, whereafter the toner material is fixed on said web by means of a fusing method, or transferred to another web of material and fixed thereon by a fusing method.

Registration signs made in this way are expensive because extensive and expensive machines are required for the manufacture thereof and/or because the waste is considerable if the toner material is transferred from one web to another.

Similar methods for manufacturing registration signs for vehicles are described in GB, A, 2 126 389 and these manufacturing methods also require an extensive and expensive equipment, whereby the signs produced become expensive.

SUMMARY OF THE INVENTION

The object of the present invention is therefore to produce signs of the above type at a lower price than what is possible by means of the prior art methods.

The invention also relates to a simple method for manufacturing the signs defined above.

Since the toner material is fixed on a preferably light-reflecting surface of the sign by means of an ionographic printer with pressure by a cold pressure and fixing method, the sign can be manufactured using less complex equipment than previously while among other things it is no longer necessary to coordinate the rotary motion of a transfer drum for transferring the toner material with the speed of the web of material onto which said toner material shall be transferred.

BRIEF DESCRIPTION OF THE DRAWINGS

The invention will be further described below with reference to the accompanying drawings, wherein FIG. 1 schematically illustrates a plant for manufacturing signs in accordance with the method of the invention.

DETAILED DESCRIPTION OF THE PREFERRED EMBODIMENT

Figure 1:
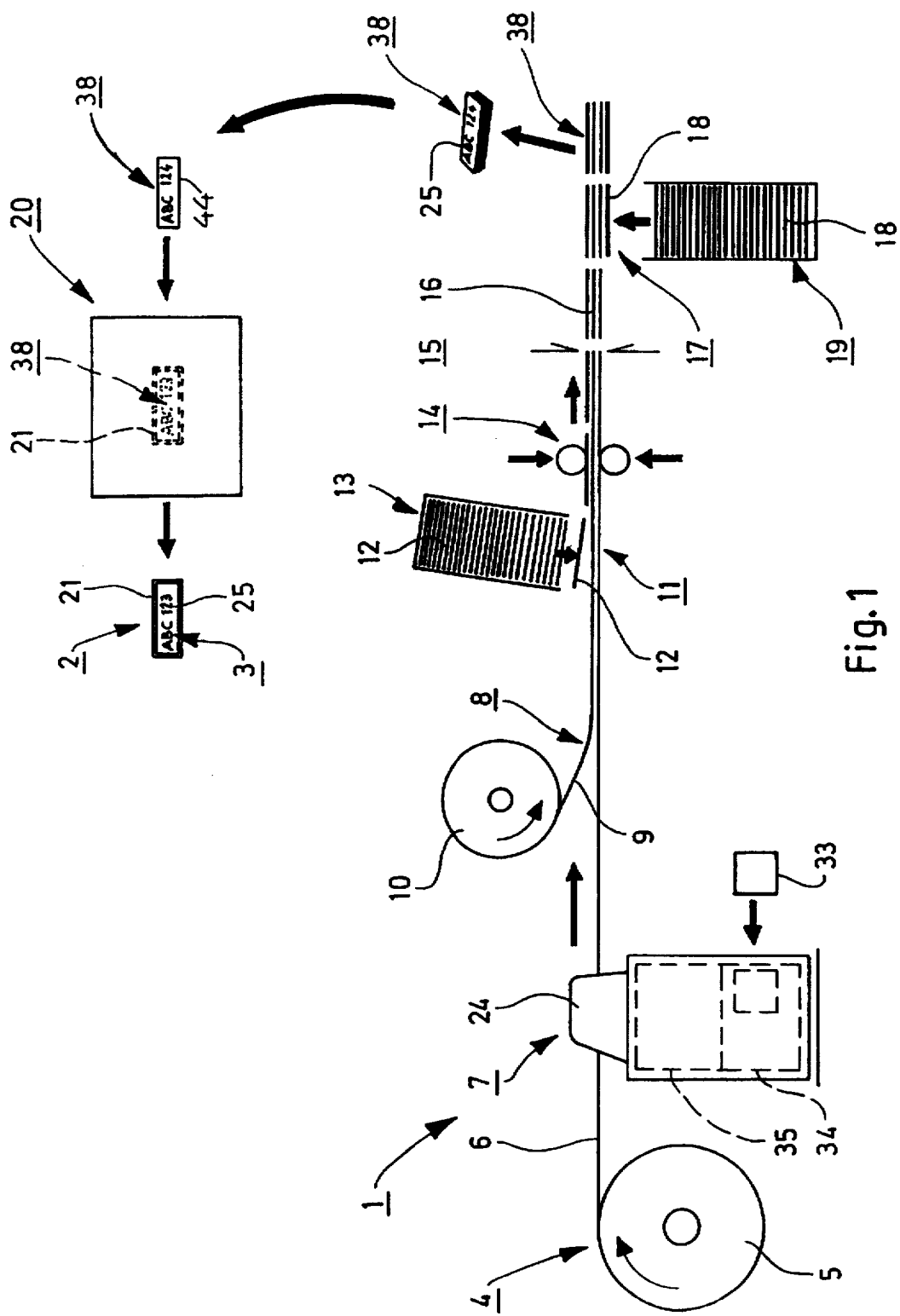

The plant 1 illustrated in FIG. 1 is adapted for continuous production of registration signs 2 for vehicles with different registration numbers 3, e.g. in consecutive order ABC 123, ABC 124, ABC 125, ABC 126 ... ABC 130 and so on. The plant 1 comprises a station 4 with a film roll 5 from which a web 6 is unrolled (instead of a roll, station 4 may alternatively include a sheet magazine). This film web 6 is run through a registration-number printing station 7 to a station 8 wherein a plastic-film web 9 with adhesive properties on both sides is brought to the film web 6 from a roll 10 of plastic film. The film webs 6, 9 are run through a station 11 wherein front plates 12 are transferred to said webs 6, 9 from a front plate magazine 13. The webs 6, 9 with front plates 12 fixed thereon are moved through a compressing station 14 and thereafter through a cutting station 15 wherein the webs are cut in portions 16 such that each portion is provided with a complete registration number. These portions 16 with front plates 12 are fed through a station 17 wherein bottom plates 18 are transferred to said portions 16 from a magazine 19 and said portions 16 including front plates 16 and bottom plates 18 are finally run through an injection moulding machine 20 wherein a frame 21 is injection moulded around each portion 16 and its front plate 12 and bottom plate 18, whereafter the registration signs 2 are finished.

The film web 6 running through the station 7 for printing the registration numbers is on the top side provided with a layer 22 of material that forms a light-reflecting surface 23. This surface 23 is intended to reflect headlamp light from vehicles.

Figure 3:
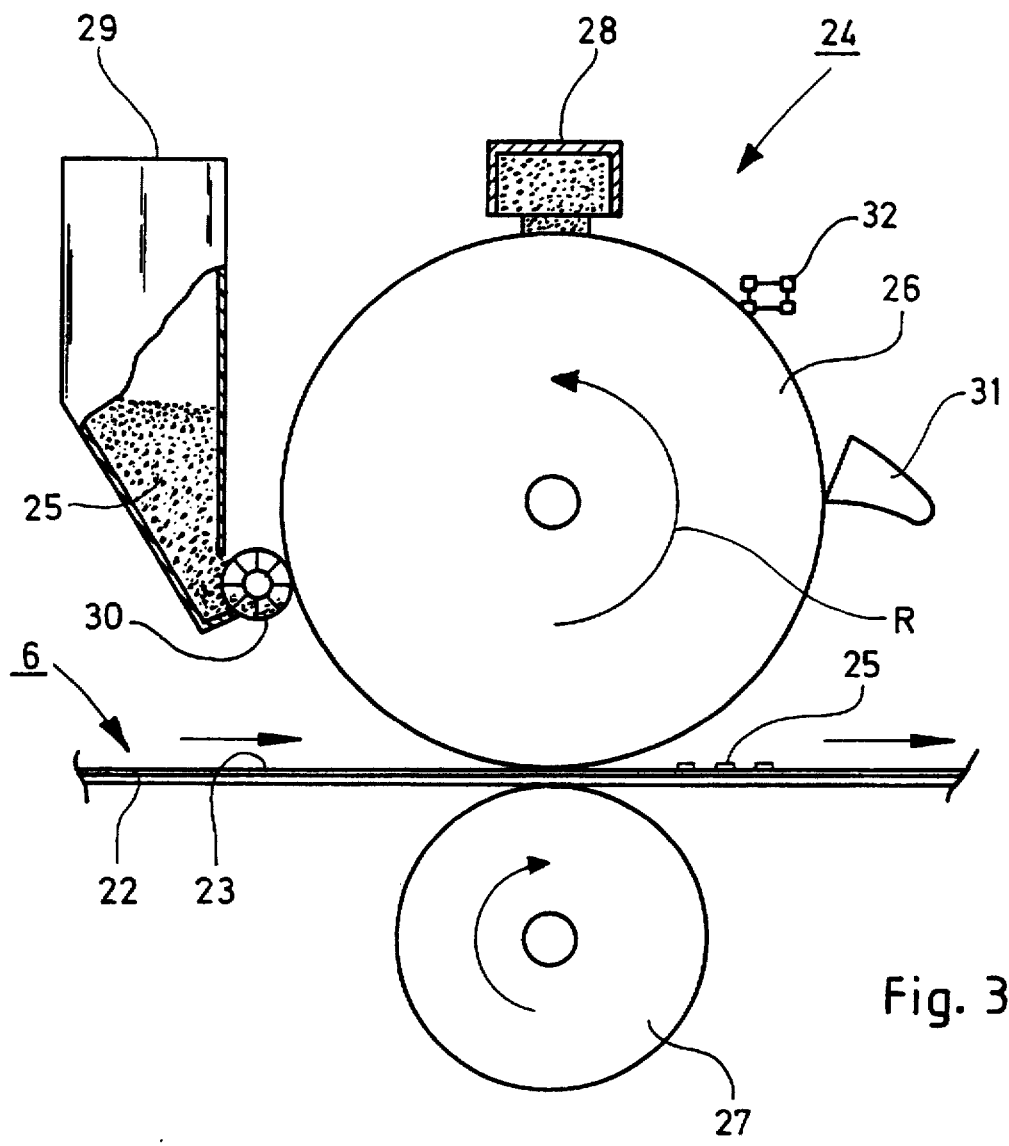
FIG. 3 with a side view schematically illustrates an ionographic printer forming part of the plant of FIG. 1.
Figure 4:
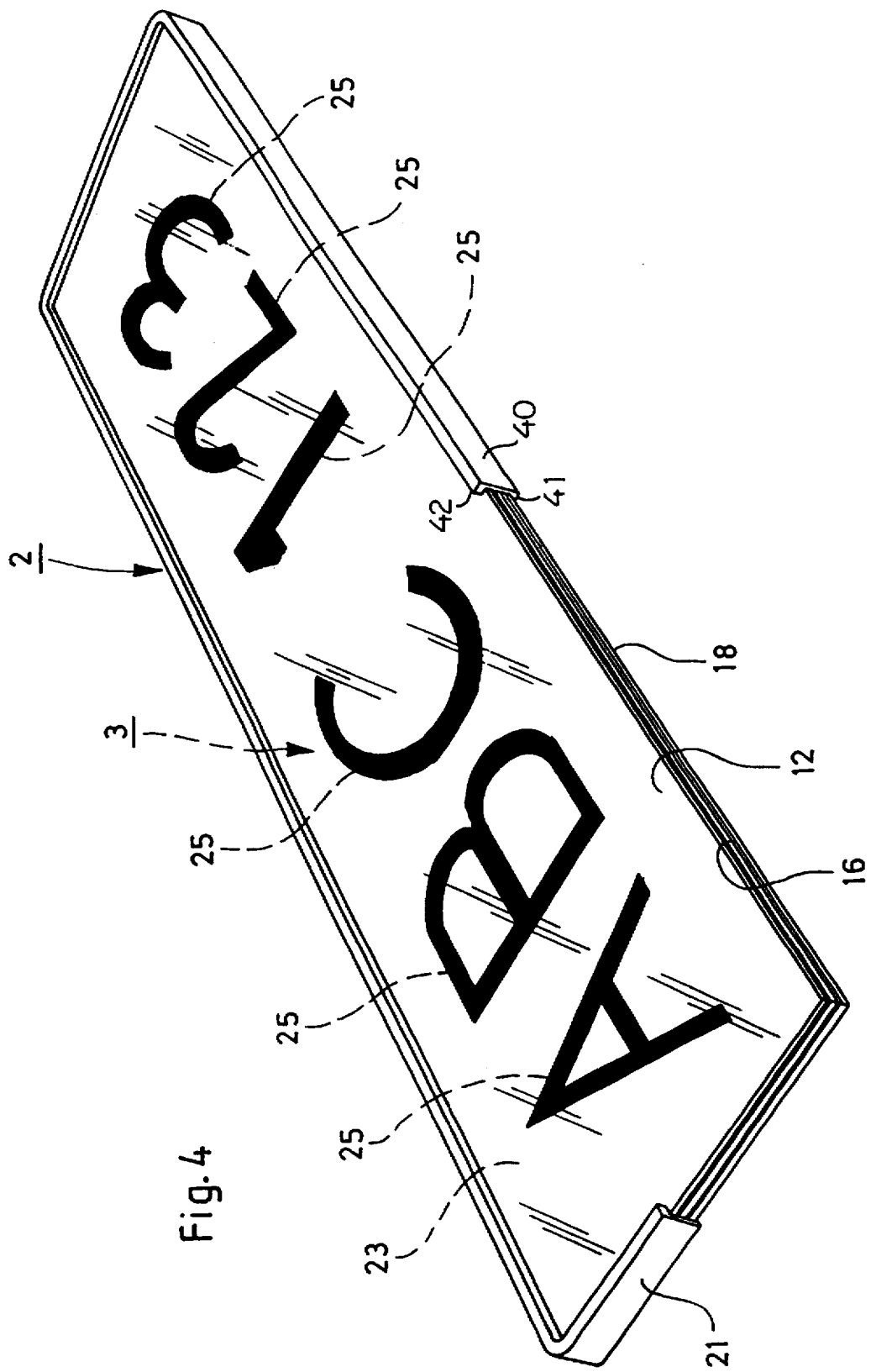
FIG. 4 is a perspective view of a sign according to the invention manufactured in the plant of FIG. 1, whereby the frame of the sign is partially cut away.
Figure 5:
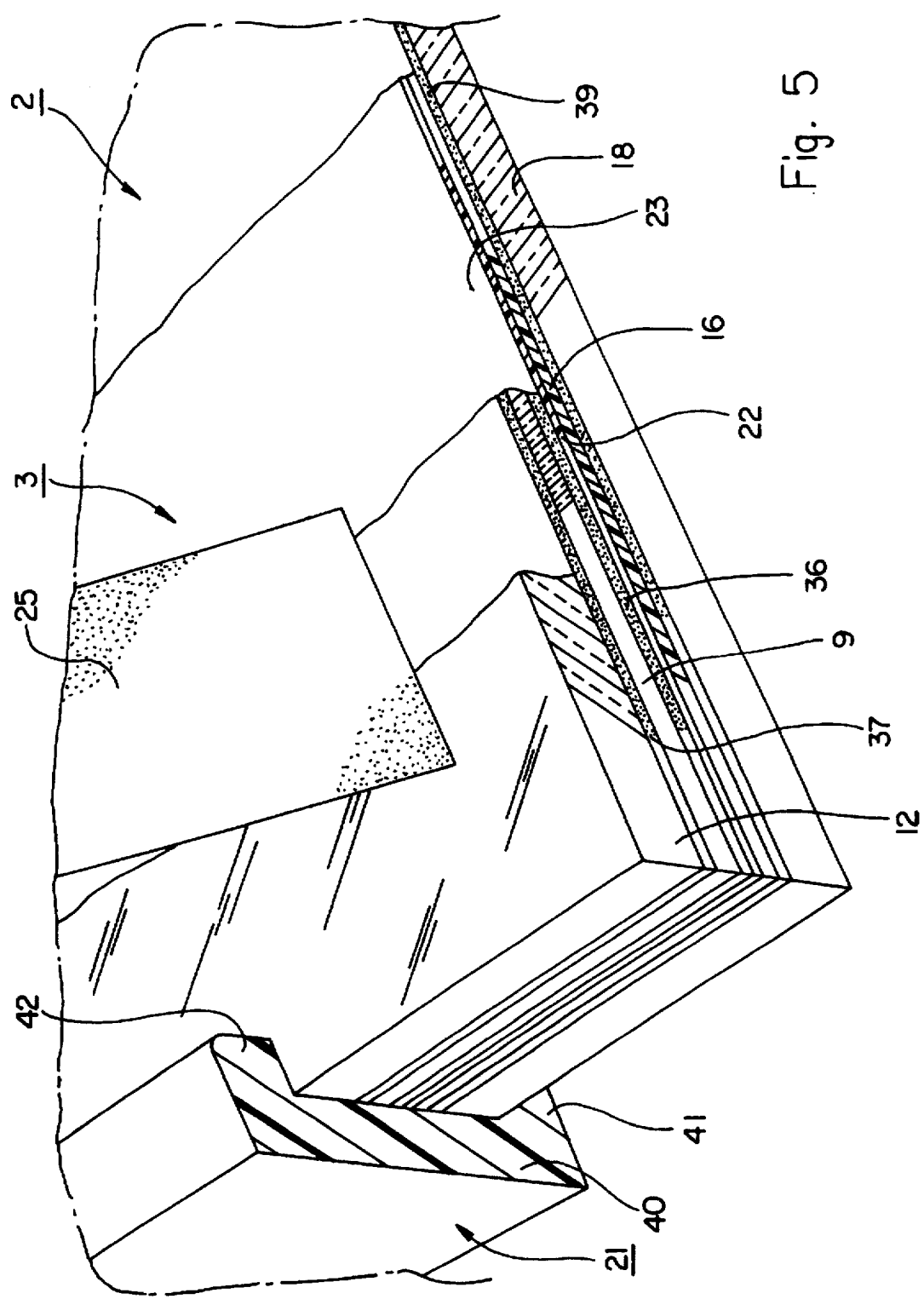
FIG. 5 with a perspective view illustrates a corner portion of the sign of FIG. 4, whereby various parts forming the sign are shown partially in section.

Printing of registration numbers is carried out continuously on the light-reflective surface 23 of the film web 6 by means of an ionographic printer 24 which applies toner material 25 onto said surface 23 and fixes it thereon with pressure while the film web 6 runs through the printer 24 at full speed. Ionographic printers 24 with such a picture transmitting function to travelling webs are already known and therefore the printer 24 is only schematically shown in FIG. 3. As is apparent from this figure, such an ionographic printer 24 includes a drum 26 for transferring toner material 25 in accordance with a predetermined picture or image to the film web 6 from above, a counter pressure roll 27 located under the web 6 just opposite to the drum 26, a so called ion cassette 28 situated close to the peripheral surface of the drum 26 and a magazine 29 for particulate toner material 25. The magazine 29 is located, seen in the direction of rotation R of the drum 26, after the ion cassette 28 and its toner material 25 is intended to be transferred to the drum 26 by a brush 30. The ionographic printer 24 further includes, in the direction of rotation R of the drum 26 after the point of contact of said drum 26 with the web 6, a scraper 31 for removing toner material remaining on the drum 26 as well as an erasing unit 32.

The ionographic printer 24 principally operates such that a supply of positive and negative ions are generated in a chamber. The positive ions are attracted by a negatively charged ion generator while some of the negative ions are gathered to a beam which is attracted by the drum 26, said drum being grounded and having a dielectric surface. When the ion beam is not used, it is held back by a strong negative field. In order for the ion beam to accelerate towards the surface of the drum 26 during build-up of the latent picture or image, the "finger"-conduits are charged with a high negative charge in relation to the shielding field.

During build-up of the latent picture—here a registration number—ionization occurs by means of what is called "drive"-conduits or "finger"-conduits.

In order to e.g. obtain a resolution of 240 points/inch, 2048 drive units are required. However, the number can be reduced in a simple manner. An inclined matrix is defined by 16 "drive"-conduits and 128 "finger"-conduits, which requires only 144 drive units.

The function is that when an area to be charged is passing under an ion beam, the "drive"-conduit as well as the "finger"-conduit for that ion beam is activated. In practice, each "drive"-conduit is activated in turn while simultaneously the "finger"-conduits for the ion beams to be used are activated.

When the latent picture or image—here a registration number—on the drum 26 is brought in contact with the toner material 25 applied by the brush 30, a circuit is defined since the toner material is conductive. Negative charge disappear from the toner material 25 through the circuit and the remaining positive charge generates attraction forces between the toner material and the negatively charged latent picture—here a registration number—on the surface of the drum 26.

The toner material 25 is thereafter transferred to the surface 23 of the web 6 and fixed by means of pressure which can be generated by the counter pressure roll 27 as a holder-on for the web 6.

The process is a cold pressure and fixing method, in English "transfixing" since transfer and fixing of the toner material 25 occur in the same process.

Since a certain charge and some toner material 25 remain on the surface of the drum 26, two processes are needed for preparing the dielectric surface.

A scraper 31 (knife) of softer material than the dielectric drum scrapes off old toner material 25 from the surface. This toner material is thereafter received in a collecting rail.

An erasing unit 32 which shall reset the surface of the drum 26 to earth or ground level, consists of a thread of resistance material which is located behind a screen of conductive material. The screen is held at a variable voltage potential while an RF-signal is applied on the thread. This creates a lot of free ions which makes the surface uncharged.

The ionographic printer 24 is controlled to print registration numbers 3 on the light-reflective surface 23 of the web in accordance with a predetermined program. This program can be recorded by a customer on a diskette 33 (or transmitted through a modem or another data carrier) and e.g. include an order for registration signs with registration numbers from ABC 123 to ABC 999. From these registration signs, two of each registration number shall be ordered for each vehicle (if it is replacement signs, only one can be ordered), and except for the registration number each sign can be provided with other marks and/or symbols, e.g. a field marking for a tax receipt and other numbers and/or bar codes for each sign 2.

The diskette 33 is inserted into a computer 34 controlling a control unit 35 which in turn operates the ionographic printer 24 to continuously provide toner pictures or images on the drum 26 corresponding to registration numbers and other information in the predetermined program and to continuously transmit these images to the reflecting surface 23 of the web 6 while the web 6 travels through the ionographic printer 24.

With this method new registration numbers 3 for registration signs 2 for vehicles can be printed continously on a web 6 which travels at a speed of e.g. 25–60 m/min. and with a great adhesitivity to the reflecting surface 23 of the web.

Figure 2:
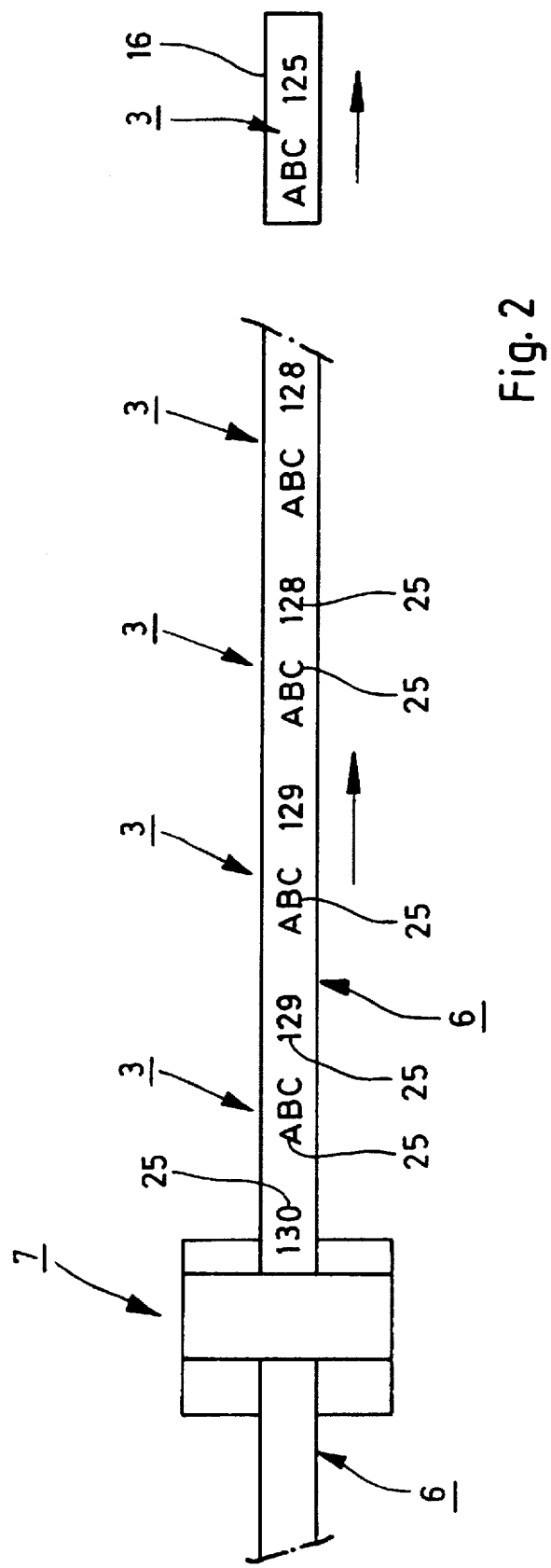
FIG. 2 with a plan view schematically illustrates members forming part of the plant of FIG. 1 as well as a web produced for manufacturing signs.

As is schematically shown in FIG. 2, the web 6 will be provided with closely behind each other located fields with registration numbers 3, whereby each registration number 3 is printed or written an optional number of times, e.g. once, twice, thrice and so on, before the next registration number 3 is printed.

The film web 6 provided with registration numbers 3 runs through the station 8 wherein the on both sides adhesive, transparent web 9 of plastic film is continuously adhered onto the top side thereof. This web 9 of plastic film includes a layer 36 of a binding agent, e.g. an adhesive layer, on the underside to enable this adherence to the web 6. The web 9 further comprises a layer 37 of a binding agent, e.g. an adhesive layer on the top or upper side for adhering the front plates 12 thereon. This is carried out continuously in station 11 and in station 14 the plastic-film webs 6 and 9 and the front plates 12 are pressed against each other to ensure that they are attached to each other.

The webs 6, 9 attached to each other and with the front plates 12 attached thereto, are cut continuously in cutting station 15 such that partially complete sign packages are continuously obtained, whereby each such partially complete sign package consists of a portion 16 and a front plate 12. These partially complete sign packages are continuously moved to the station 17 for continuous supply of bottom plates 18. These plates have a layer 39 of a binding agent, preferably an adhesive layer, on one side, whereby a bottom plate 18 can be brought to adhere to that portion 16 of the sign package 38 which is formed by the film web 6. Alternatively, the layer 39 of binding agent can be applied to the underside of the film web 6 instead, or a separate layer 39 of binding agent can be placed between the film web 6 and bottom plate 18 with special equipment. The sign packages 38, each of which now consists of the front plate 12, a portion 16 (including the film 9 with adhesive on both sides) and a bottom plate 18, and has a generally rectangular periphery 44 are continuously transferred to the injection moulding device 20, in which the sign packages 38 are continuously provided with the frame 21. Each frames 21 is made of a plastic material which is injection moulded along and around the periphery 44 of the associated sign package 38 in such a way that it sealingly closes said sign package along all sides thereof. The frame 21 preferably has a substantially U-shaped cross section, whereby its web portion 40 from the outside covers the edges of the sign package 38, while one of its shanks 41 closely engages the underside of the bottom plate 18 and the other shank 42 closely engages the upper or top side of the front plate 12.

The sign portions are preferably made of plastic material of such similar type that the sign can be completely recovered.

The frame 21 preferably consists of the same or similar plastic material as the members engaged thereby—such as the bottom plate 18 and front plate 12 and eventually the edges of intermediate portions 9 and 16. Hereby, the plastic material of the frame 21 may through heating be fused or melted together with the plastic material of the bottom and front plates 18 and 12 respectively, and eventually with the plastic material of portions 9 and 16, whereby the frame 21 defines a completely sealed unit together with the members and portion 12, 18, 9 and 16 within said frame.

The registration signs 2 ordered according to the program of the customer are thereby manufactured continuously at a high speed and with exactly the registration numbers 3 ordered by the customer, whereby it is possible to produce complete registration signs at a high speed.

Each manufactured registration sign 2 is designed such that its registration number can not be damaged or made indistinct during normal use. Each registration sign 2 made also becomes so robust that it can withstand heavy shock loads and have such elasticity that it yields instead of breaks in light collisions.

Additionally, the film web 6 may consist of or contain such material and/or be designed such that damages thereon and/or on other portions of the sign can not be hidden if one tries to restore the film web 6 and/or other portions of the sign or unauthorized manipulation thereof.

The invention is not limited to the signs defined above or to the method described above for the manufacture thereof, but the sign and the method of manufacture may vary within the scope of the following claims.

As examples of alternatives to the sign and the method of manufacture defined above, it should be mentioned that the information can be provided by electronically variable application of information-defining material by other devices than said ionographic printers. Thus, other electronic printers can be used as well as ink beam writers of various types. If the signs are registration signs, they need not be manufactured with registration numbers in consecutive order but in other orders as desired by the customer. The signs however, can be of other types than registration signs for vehicles and the information can be of totally different type than features for registration. Thus, the information can be any type of text, symbol or picture information which can be provided by electronically variable application of information-defining material, e.g. toner material, by transfer thereof from a toner drum to a web. The ionographic printer used for the application of the toner material is particularly suitable for printing or writing on surfaces of reflecting material, but it can also be used for printing on other materials. The web on which the information shall be applied can be of the type used for manufacturing plastic labels, but also of other suitable materials, e.g. plastic material. Thus, the web may e.g. consist of material which simultaneously forms the cover plate and information carrier. At such an embodiment, the information, e.g. the toner material, can be applied on that side of the web which defines the underside of the cover plate and eventually, said underside can thereafter be provided with reflecting material. Hereby, signs can be produced, which consist only of a plate that protects the information applied on the underside thereof. The web may—as is shown in FIG. 1—consist of a longitudinal film band or strip, but it can alternatively consist of a row of separate film portions.

The double adhesive plastic film web can be dispensed with and the front plates instead be provided with a layer of binding agent in order to directly attach these and the web carrying the information to each other. The frame and bottom plate can be constructed as a unit and the web with the information can be provided with watermarks or another visible or invisible security marking. If the signs comprise various layers as is shown in the drawings, these layers are preferably pasted to each other along the major portion, preferably all portions of their surfaces, which prevents penetration of moisture and particles of dirt therebetween. Hereby, it is ensured that one also can drill holes through the signs for mounting screws without penetration of moisture and dirt between the layers through such holes. The various members or parts of the sign may consist of other than said materials and the frame can be made and/or located in other ways than by injection moulding. The front plate preferably consists of such a material that it withstands exterior damage when in traffic, e.g. flying stones, moisture, intensive washing etc.. The information applied onto the portions 16 may except for registration symbols be information about state code and/or state symbol and/or national colour and/or national flag.

The registration symbols can be applied onto consecutive portions 16 in alphabetical and numerical order for a certain customer and in a non-alphabetical and non-numerical order for another customer.

The plant illustrated in the drawings may vary e.g. with regard to type and number of stations in view of the type of signs to be produced and the number of layers in each sign.

I claim:

1. A registration sign for vehicles, said sign (2) comprising:

a sign portion (16) including a film (6) and having a light reflecting surface (23), said portion (16) being provided with characters (3) formed by toner material (25) applied to said light reflecting surface (23) by means of an ionographic printer (24) whereby said toner material (25) is fixed onto said light reflecting surface (23) of said portion (16) by a cold pressure and fixing method, a bottom plate (18) with a top face and a bottom face, a front plate (12) with a top face and a bottom face and which plates (18 and 12) are located respectively on opposite sides of said portion (16), said bottom plate (18) and said front plate (12) both being of substantially the same size and shape as said portion (16) and said bottom plate (18) and front plate (12) and portion (16) having peripheral edges essentially registered with one another, said front plate (12) being made of such transparent material that the registration characters (3) on said portion (16) are visible therethrough, said portion (16) being attached to said top face of said bottom plate (18) by a layer of adhesive (39) extending over essentially the entirety of said top face of said bottom plate and said portion (16) being attached to said bottom face of said front plate (12) by at least one other layer of adhesive (37) extending over essentially the entirety of said bottom face of said top plate so that said layers of adhesive obstruct penetration of moisture and contaminants between said portion (16) and said bottom and front plates (18 and 12), said portion (16) and bottom and front plates (18 and 12) forming a sign package (38) having a periphery (44), and a frame (21) made of injection molded plastic surrounding said periphery (44) of said sign package (38), said frame having a substantially U-shaped cross section with a web portion (40) which outwardly covers said peripheral edges of said bottom plate (18) and of said sign portion (16) and of said front plate (12), and said U-shaped cross section of said frame (21) also having one shank (41) heat sealed to said bottom face of said bottom plate (18) and another shank (42) heat sealed to said top face of said front plate (12), so that said frame obstructs penetration of moisture and contaminations into said sign package and prevents unauthorized manipulation thereof.

2. A sign according to claim 1 wherein said portion (16) is such that unauthorized damage thereto cannot be hidden by attempts to restore said portion to its original condition.

3. A sign according to claim 1 wherein said front plate (12) consists of a material which withstands exterior damage due to flying stones, moisture and intensive washing.

4. A sign according to claim 1 wherein said front and bottom plates (12 and 18) are made of plastic material, said frame (21) consists of plastic material similar to that of said bottom plate (18) and said front plate (12) so that the entire sign is recoverable.

5. A sign according to claim 1 wherein said toner material (25) is one that has been applied to said surface (23) by means of a printer controlled to apply said registration characters (3) in accordance with a program including ordered registration characters.

6. A sign according to claim 1 wherein said portion (16) includes other symbols in addition to said registration characters (3).

7. A sign according to claim 1 wherein said at least one other layer of adhesive (37) is associated with a transparent plastic film web (9) located between said front plate (12) and said portion (16), said plastic film web (9) having a top face and a bottom face, said at least one other layer of adhesive (37) being located between said bottom face of said front plate (12) and said top face of said film web (9), and another layer of adhesive (36) located between said bottom face of said film web (9) and said portion (16), said another layer of adhesive (36) extending over essentially the entirety of said bottom face of said film web (9).

8. A registration sign for vehicles, said sign (2) comprising:

a sign portion (16) including a film (6) and having a light reflecting surface (23), said portion (16) being provided with characters (3) printed onto said light reflecting surface (23), a bottom plate (18) with a top face and a bottom face, a transparent front plate (12) with a top face and a bottom face and which bottom and front plates (18 and 12) are located respectively on opposite sides of said portion (16), said bottom plate (18) and said front plate (12) both being of substantially the same size and shape as said portion (16) and said bottom plate (18) and front plate (12) and portion (16) having peripheral edges essentially registered with one another, said portion (16) being attached to said top face of said bottom plate (18) by a layer of adhesive (39) extending over essentially the entirety of said top face of said bottom plate and said portion (16) being attached to said bottom face of said front plate (12) by at least one other layer of adhesive (37) extending over essentially the entirety of said bottom face of said top plate so that said layers of adhesive obstruct penetration of moisture and contaminants between said portion (16) and said bottom and front plates (18 and 12), said portion (16) and bottom and front plates (18 and 12) forming a sign package (38) having a periphery (44), and a frame (21) made of injection molded plastic surrounding said periphery (44) of said sign package (38), said frame having a substantially U-shaped cross section with a web portion (40) which outwardly covers and is heat sealed to said peripheral edges of said bottom plate (18) and of said sign portion and of said front plate (12), and said U-shaped cross section of said frame (21) also having one shank (41) heat sealed to said bottom face of said bottom plate (18) and another shank (42) which heat sealed to said top face of said front plate (12), so that said frame obstructs penetration of moisture and contaminations into said sign package and prevents unauthorized manipulation thereof.

9. A sign according to claim 8 wherein said front and bottom plates (12 and 18) are made of plastic material, said frame (21) consists of plastic material similar to that of said bottom plate (18) and said front plate (12).

* * * * *